United States Patent [19]

Lloyd

[11] 4,057,238
[45] Nov. 8, 1977

[54] ADJUSTABLE EFFECTIVENESS SUPPORT SPRING DEVICE

[75] Inventor: Wayne B. Lloyd, Baltimore, Md.

[73] Assignee: Westinghouse Electric Corporation, Pittsburgh, Pa.

[21] Appl. No.: 688,496

[22] Filed: May 20, 1976

[51] Int. Cl.² ............................................. F16F 7/00
[52] U.S. Cl. ................................. 267/136; 267/173; 248/20
[58] Field of Search ............... 267/166, 173, 175, 177, 267/136; 248/20

[56] References Cited

U.S. PATENT DOCUMENTS

| | | | |
|---|---|---|---|
| 3,288,419 | 11/1966 | Wallerstein, Jr. | 267/173 |
| 3,552,694 | 1/1971 | Flannelly | 248/20 |
| 3,767,181 | 10/1973 | Von der Burnt et al. | 267/136 |

*Primary Examiner*—James B. Marbert
*Attorney, Agent, or Firm*—D. F. Straitiff

[57] ABSTRACT

An adjustable-effectiveness support spring device for vibration-isolating support of an airborne load subject to varying g forces in both positive and negative directions. A vertically movable load support rod is interconnected for support by a mounting base through the medium of a low pickup value helical spring means and a rockable lever assembly. Adjusting position of the spring means and a fulcrum means along the length of the lever assembly adjusts the support effectiveness of the weak spring means as well as the direction of its effort imparted to the support rod.

2 Claims, 5 Drawing Figures

ADJUSTABLE EFFECTIVENESS SUPPORT SPRING DEVICE

BACKGROUND OF THE INVENTION

1. Field of the Invention

Spring supports for vibration isolating support of an airborne load.

2. Description of the Prior Art

Where such as helical compression springs are employed for passive vibration isolating support of an airborne load, it is desirable to make the springs weak in behalf of reducing coupling of vibratory motion through the springs, but this poses the problem of avoiding bottoming out of the spring support system under influence of varying $g$ force situations due to maneuvering of the aircraft. Heretofore insofar as applicant is aware, either bottoming out was tolerated, at the expense of loss of vibration isolation, the springs were made stiff, thus compromising the extent of their effectiveness, or active isolation means were brought into play in parallel with the springs to help out during $g$ load variations, which entails considerable load-supporting work effort with potential for some interference with the vibration-isolating effectiveness of the springs.

SUMMARY OF THE INVENTION

The present invention overcomes the above limitations of the prior art spring support systems by use of weak springs and adjusting their support effect on the load to prevent bottoming out under varying $g$ loads while preserving the superior vibration isolating capability of weak springs. In accomplishing this by movement of springs and fulcrum along a rockable lever assembly according to $g$ force variations, both negative and positive $g$ force situations can be accommodated and work effort can be minimized. This latter attribute is so because the active means for effecting the spring and fulcrum positioning does not become involved in itself supporting the load.

DESCRIPTION OF THE PREFERRED EMBODIMENT

Figure 1:
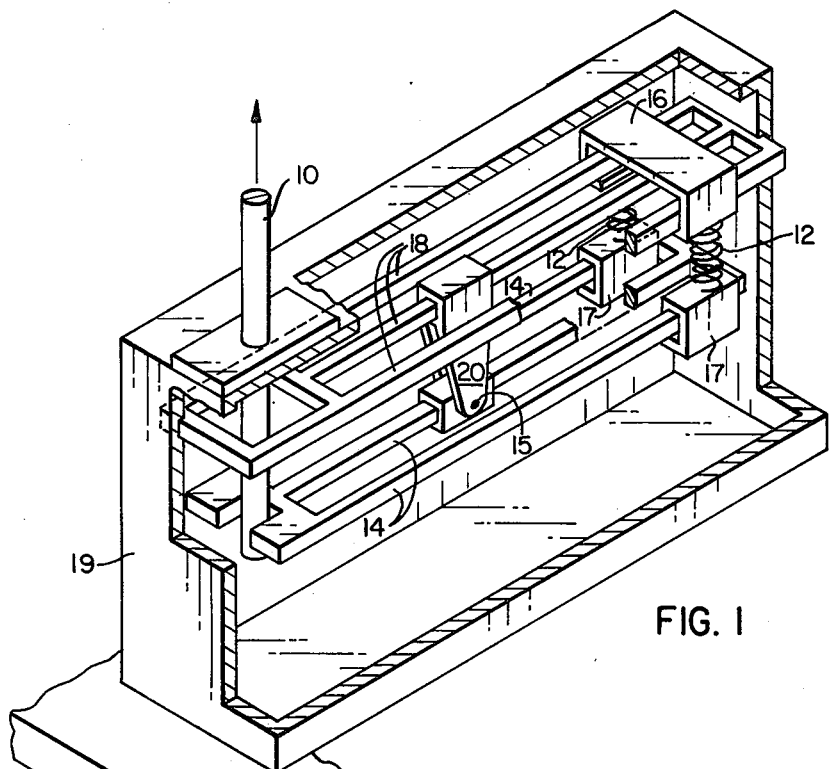
FIG. 1 is a three-dimensional cutaway view of an illustrative preferred embodiment of the present invention as to its basic structural and functional components.

Referring to the drawing, the adjustable-effectiveness spring support device of the present invention comprises a vertically movable support rod 10 for load-supporting connection to a platform or the like (not shown) carrying such as electronic and/or optical equipment to be protected from vibration and a mounting base 11 for securement to the frame of an aircraft, such as a military aircraft prone to vibration and to high speed maneuvering in different attitudes, both upright and upside down.

In accordance with the primary features of the present invention, the load support rod 10 is supported by the mounting base 11 through the medium of a pair of vertically-arranged weak helical compression springs 12 and an array of longitudinal members constituting a lever means rockable vertically about a horizontally positionable fulcrum pin 15. The springs 12 are interposed vertically between upper spring seats 16 and lower spring seats 17. Upper spring seats 16 are movable along an array of longitudinal members 18 that constitute a fixed guideway affixed to the mounting base 11 via a housing 19. A fulcrum assembly 20 that includes the fulcrum pin 15 extends vertically between one of the members 18 and one of the members 14. By virtue of this arrangement, the springs 12 exert a downward force on the members 14 which under such influence tend to rock about the fulcrum pin 15 and exert a support force on the load support rod 10. Aside from the spring force, the extent of such force acting on the rod 10 depends on the distance between the springs 12 and the fulcrum pin 15 and between the fulcrum pin 15 and the support rod 10. By adjusting the horizontal positions of the fulcrum pin 15 and the springs 12, the vertical support force derived from the springs 12 and applied to the load support rod 10 can be adjusted to maintain a certain desirable vertical clearanceway for vibration-isolating spring deflection irrespective of varying $g$ loads resulting from aircraft motion.

Figure 2:
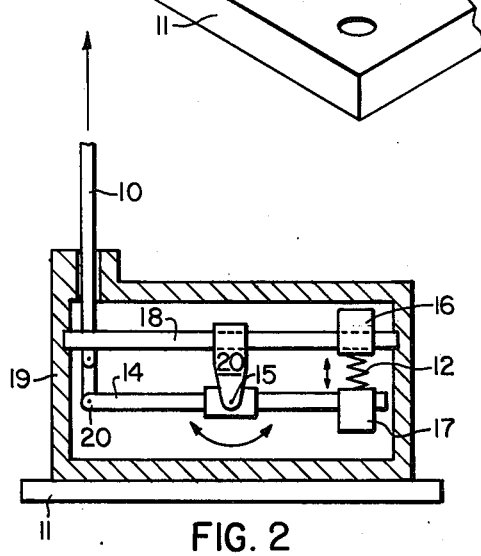
FIGS. 2 and 3 are elevation views showing parts of the apparatus of FIG. 1 in two different typical operational positions.
Figure 3:
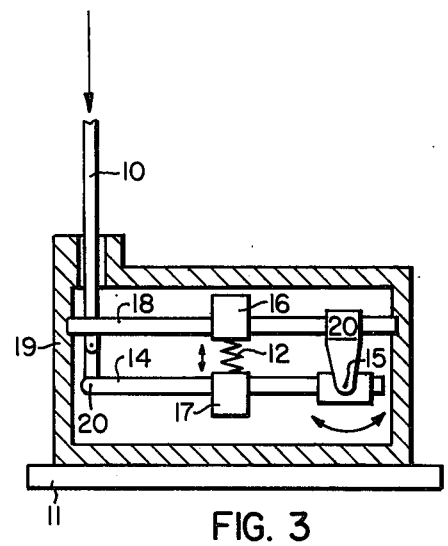

In accord with a feature of the invention, the arrays of lower and upper longitudinal members 14 and 18 are constructed to provide guidance and support of the fulcrum assembly 20 between the guidance and support for the springs 12 in a manner that permits the fulcrum and springs to pass each other longitudinally along such members to accommodate both positive $g$ loading on the support rod 10 as in FIG. 2 and negative $g$ loading of the support rod 10 as in FIG. 3. When the $g$ force is positive, the fulcrum assembly 20 is maintained disposed between the springs 12 and the support rod 10, and when the $g$ forces are negative, the springs 12 are maintained positioned between the fulcrum assembly 20 and the support rod 10. A bridging arrangement for the upper spring supports 16 as shown in FIG. 1 can be employed to facilitate such relative fulcrum and spring positioning.

Figure 5:
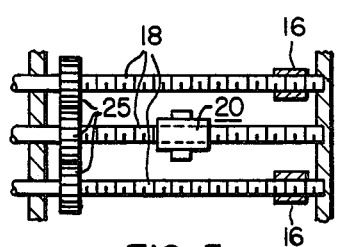
FIGS. 4 and 5 are fragmentary views of an exemplified power drive means for controlling operation of the device of FIGS. 1 to 3.
Figure 4:
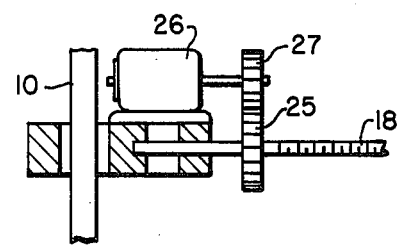

An exemplified manner in which the longitudinal movement of the springs 12 and fulcrum assembly 20 can be effectuated is exemplified in FIGS. 4 and 5. By making each of the horizontal members 14 and 18 in the form of an elongated screw-threaded drive, turning them in unison by a suitable gear train 25 operated by a synchro motor 26 via a pinion 27 can effect relative longitudinal movement of the fulcrum assembly 20 and the spring seats 16 and 17. The upper such arrangement is shown in FIGS. 4 and 5, a similar arrangement (not shown) is provided for the lower spring supports and fulcrum assembly lower end.

Control of the synchro motor operation to effect such spring effectiveness adjustment can involve the use of a position pickoff (not shown) for reading the vertical position of the support rod 10 relative to the base 11, for example, together with suitable circuitry for translation of such position information into motor operation commands.

What is claimed is:

1. A vibration isolating support spring device, comprising
   a mount member which may be subject to vibration,
   a vertically movable rod for supporting connection to a load to be protected from vibration,
   a horizontal lever means having an operative connection with said rod, fulcrum means carried by said mount member and movable to different positions along said lever means in rockable support thereof, compression coil spring means carried by said mount member and movable to different positions along said lever means in rod-force-opposing action thereon, and adjustable means for simultaneously moving the fulcrum and spring means to their aforesaid different positions in behalf of balancing different external load conditions imposed on said rod.

2. The vibration isolating support spring device of claim 1, wherein, said lever means, fulcrum means, and adjustable means are so constructed and arranged as to permit said spring means and said fulcrum means to pass one another longitudinally along said lever means to enable such spring means to oppose imposition of both positive and negative external load forces on the aforesaid rod.

* * * * *